(12) United States Patent
Miko et al.

(10) Patent No.: US 11,987,869 B2
(45) Date of Patent: May 21, 2024

(54) METHOD FOR MANUFACTURING ALLOYS OF PRECIOUS METALS AND ALLOYS OF PRECIOUS METALS THUS OBTAINED

(71) Applicant: The Swatch Group Research and Development Ltd, Marin (CH)

(72) Inventors: Csilla Miko, Essertines-sur-Yverdon (CH); Rémi Grosjean, Bienne (CH); Jean-Luc Bazin, Tuscherz-Alfermee (CH)

(73) Assignee: The Swatch Group Research and Development Ltd, Marin (CH)

( * ) Notice: Subject to any disclaimer, the term of this patent is extended or adjusted under 35 U.S.C. 154(b) by 622 days.

(21) Appl. No.: 17/273,918

(22) PCT Filed: Jul. 17, 2020

(86) PCT No.: PCT/EP2020/070283
§ 371 (c)(1),
(2) Date: Mar. 5, 2021

(87) PCT Pub. No.: WO2021/009349
PCT Pub. Date: Jan. 21, 2021

(65) Prior Publication Data
US 2021/0331241 A1 Oct. 28, 2021

(30) Foreign Application Priority Data
Jul. 18, 2019 (EP) ..................... 19187108

(51) Int. Cl.
| | |
|---|---|
| *C22C 5/02* | (2006.01) |
| *B22F 1/00* | (2022.01) |
| *B22F 1/05* | (2022.01) |
| *B22F 1/052* | (2022.01) |
| *B22F 1/102* | (2022.01) |
| *B22F 9/24* | (2006.01) |
| *B28B 1/00* | (2006.01) |
| *B28B 11/24* | (2006.01) |
| *B33Y 10/00* | (2015.01) |
| *B33Y 40/10* | (2020.01) |
| *B33Y 70/00* | (2020.01) |
| *C01B 35/04* | (2006.01) |
| *C22C 29/14* | (2006.01) |
| *B22F 10/14* | (2021.01) |
| *B22F 10/28* | (2021.01) |

(52) U.S. Cl.
CPC ............... *C22C 5/02* (2013.01); *B22F 1/05* (2022.01); *B22F 1/052* (2022.01); *B22F 1/09* (2022.01); *B22F 1/102* (2022.01); *B22F 9/24* (2013.01); *B28B 1/001* (2013.01); *B28B 11/243* (2013.01); *B33Y 10/00* (2014.12); *B33Y 40/10* (2020.01); *B33Y 70/00* (2014.12); *C01B 35/04* (2013.01); *C22C 29/14* (2013.01); *B22F 10/14* (2021.01); *B22F 10/28* (2021.01); *B22F 2301/255* (2013.01); *B22F 2302/05* (2013.01); *B22F 2304/10* (2013.01); *C01P 2004/50* (2013.01)

(58) Field of Classification Search
CPC .......... C22C 5/02; C22C 29/14; C22C 1/053; C22C 1/058; C22C 1/10; C22C 32/0005; C22C 1/0466; C22C 5/00; C22C 1/1052; C22C 1/1036; C22C 1/051; B22F 1/05; B22F 1/052; B22F 1/09; B22F 1/102; B22F 9/24; B22F 10/14; B22F 10/28; B22F 2301/255; B22F 2302/05; B22F 2304/10; B22F 3/15; B22F 2003/1051; B22F 2003/247; B22F 2998/10; B22F 3/02; B22F 9/04; B22F 10/18; B22F 3/12; B22F 5/00; B22F 10/10; B22F 2301/25; B28B 1/001; B28B 11/243; B33Y 10/00; B33Y 40/10; B33Y 70/00; B33Y 70/10; B33Y 50/02; B33Y 80/00; C01B 35/04; C01B 35/02; C01P 2004/50; Y02P 10/25

See application file for complete search history.

(56) References Cited

U.S. PATENT DOCUMENTS

| | | | |
|---|---|---|---|
| 2006/0231171 A1 | 10/2006 | Davis et al. | |
| 2015/0376020 A1* | 12/2015 | Jung | ............ C01B 35/04 428/220 |

FOREIGN PATENT DOCUMENTS

| | | | | |
|---|---|---|---|---|
| JP | 2016-12563 A | | 1/2016 | |
| JP | 2016012563 A | * | 1/2016 | ............ C01B 35/04 |
| WO | WO 2006/113847 A2 | | 10/2006 | |

OTHER PUBLICATIONS

Grosjean, "Boron-based nanomaterials under extreme conditions", Chemical Physics [physics.chem-ph], Universite Pierre et Marie Curie—Paris VI, 2016, Retrieved form the Internet: https://tel.archives-ouvertes.fr/tel-01898865/document, XP055661399, 169 total pages (Year: 2016).*

(Continued)

*Primary Examiner* — Rebecca Janssen
(74) *Attorney, Agent, or Firm* — Oblon, McClelland, Maier & Neustadt, L.L.P.

(57) ABSTRACT

A method for manufacturing an alloy formed from a boride of a precious metal, may involve reacting a source of the precious metal with a source of boron in a salt or a mixture of salts in the molten state. An alloy formed from a boride of a precious metal may include crystalline nanoparticles of $M_xB_y$ with M being a precious metal, distributed in an amorphous matrix of B or in an amorphous matrix of B and of $M_zB_a$.

5 Claims, No Drawings

(56) References Cited

OTHER PUBLICATIONS

Japanese Office Action dated May 10, 2022 in Japanese Patent Application No. 2021-512706 (with English translation), 6 pages.
International Search Report dated Oct. 13, 2020 in PCT/EP2020/070283 filed on Jul. 17, 2020, 3 pages.
Süss et al., "18 Carat Yellow Gold Alloys with Increased Hardness", Gold Bulletin, 2004, vol. 37, No. 3-4, XP002713239, pp. 196-207.
Grosjean, "Boron-based nanomaterials under extreme conditions", Chemical Physics [physics.chem-ph], Universite Pierre et Marie Curie—Paris VI, 2016, Retrieved form the Internet: https://tel.archives-ouvertes.fr/tel-01898865/document, XP055661399, 169 total pages.
International Preliminary Report on Patentability and Written Opinion dated Jan. 18, 2022 in PCT/EP2020/070283 (submitting English translation only), 7 pages.

* cited by examiner

METHOD FOR MANUFACTURING ALLOYS OF PRECIOUS METALS AND ALLOYS OF PRECIOUS METALS THUS OBTAINED

TECHNICAL FIELD OF THE INVENTION

The present invention relates to a method for manufacturing alloys of precious metals. The present invention also relates to such alloys of precious metals and the parts made with these alloys. In particular, the present invention relates to a method for manufacturing light alloys of precious metals obtained from gold, silver, platinum, palladium, ruthenium or iridium. The light alloys of precious metals in question here are titratable, that is to say that these are alloys, the ratio of which between the mass of the precious metal that enters into the composition of the alloy and the total mass of this alloy is determined by law.

TECHNOLOGICAL BACKGROUND OF THE INVENTION

In the sense of the present invention and hereinafter, precious metal means a metal chosen from the group consisting of gold, silver, platinum, palladium, ruthenium and iridium.

The precious metals such as gold are used in numerous fields such as jewellery and horology. Gold has the disadvantage of being easily deformable with the corollary that a simple impact suffices to deform the jewel made using this precious metal. This is why very early it was sought to improve the mechanical properties of gold by alloying it with other metal elements. In this regard, silver and copper are the two main metals used to improve the rigidity of gold. The alloying of gold with other metal elements such as silver or copper leads to metal alloys, the hardness of which is greater than that of gold. Nevertheless, these alloys of gold have the disadvantage of having a high density. This is why it was attempted to alloy gold with metal elements having a lower density.

Trials were carried out to attempt to alloy gold (Au), which is a heavy metal, that is to say a metal, the density of which is high (approximately 19.3 g·cm$^{-3}$), with boron (B), which is a very light metal, that is to say a metal, the density of which is low (approximately 2.3 g·cm$^{-3}$). Nevertheless, the attempts carried out up to today to attempt to alloy gold and boron ended in failures or, at best, led to very low rates of dissolution of the boron, not allowing to envisage industrial production. The materials resulting from the combination of gold and boron indeed turned out to be unstable and it turned out to be impossible to create titratable massive components such as 18-karat gold using this combination. These problems are explained in particular by the fact that during a conventional method of alloying by melting the elements, it is not managed to mix the gold and the boron. Indeed, because of its high density, the gold has a tendency to sediment at the bottom of the crucible, while the boron having a lower density floats.

Thus, numerous documents such as chapter 10 of the Handbook of Solid State Chemistry, First Edition, Edited by Richard Dronskowski, Shinichi Kikkawa, and Andreas Stein, published in 2017, note the impossibility of creating borides of precious metals rich in boron, namely $M_xB_y$, metal borides in which M is a metal with a ratio of y to x greater than or equal to 1.

For example, in the case of palladium, it was possible to obtain metal borides, the boron content of which did not exceed $Pd_6B$ to $Pd_2B$. It was possible to obtain $PtB_{0.7}$ for platinum, which is located at the lower limit of the metal borides rich in boron. For an 18-karat gold, that is to say containing 75% by mass of gold, it is necessary to have a composition close or equal to $AuB_{5.7}$, which, to the best of the applicant's knowledge, has not been carried out for the moment.

SUMMARY OF THE INVENTION

The goal of the present invention is to provide a method for manufacturing light alloys of precious metals allowing in particular to obtain light alloys of precious metals stable from a physicochemical point of view and using which it is possible to create massive components. More precisely, the method according to the invention involves creating an alloy of a precious metal and of boron by reaction of a source of said precious metal with a source of boron in a mixture of molten salts acting as a solvent. The source of boron is in the state of a powder, possibly weakly aggregated, and the source of precious metal is also in the state of a powder. The mixture of the source of boron, of the source of precious metal and of the salt(s) can then be subjected to gentle grinding, for example carried out by means of a mortar, this operation being carried out in a dry atmosphere, that is to say free from moisture, and which is preferably inert.

Preferably, the source of boron is a sodium borohydride and the source of precious metal is a chloride of said precious metal. The alloy coming from this method is formed by nanoparticles of boride of precious metal $M_xB_y$, where M is the precious metal, distributed in a matrix of boron B. The ratio y/x of the nanoparticles of boride of precious metal $M_xB_y$ is greater than or equal to 1 and, more preferably, greater than or equal to 2. The method according to the invention thus allows to create alloys of precious metals rich in boron.

According to an embodiment of the invention, the alloy of precious metal and of boron is directly used to manufacture a part via powder metallurgy.

According to another embodiment of the invention, the alloy of precious metal and of boron coming from the method by synthesis in molten salts according to the invention is enriched with precious metal before manufacturing the part by powder metallurgy.

The present invention thus relates to the alloy of precious metal and of boron directly coming from the method for manufacturing by synthesis in molten salts as well as the alloy enriched with precious metal. It also relates to the parts, in particular the timepieces or pieces of jewellery, made with the alloy of precious metal and of boron directly coming from the method for manufacturing by reaction in molten salts or with this same alloy enriched with precious metal. Indeed, it is possible for the ratio y/x to be too great to create, for example, an 18-karat gold. In this case, the matrix of boron is enriched with the precious metal.

The method according to the invention allows to obtain alloys of precious metal and of boron that have both excellent mechanical properties and a low density. To the best of the applicant's knowledge, the method according to the invention offers, for the first time, the possibility of alloying, on an industrial scale, a component with a very low density, in this case boron, with a precious metal, in particular but not exclusively gold, the density of which is high. Remarkably, in the method according to the invention, the precious metal selected and the boron are closely alloyed, without it ever being possible to observe a phenomenon of segregation between the two materials.

DETAILED DESCRIPTION OF AN EMBODIMENT OF THE INVENTION

The present invention relates to a method for manufacturing a boride of a precious metal, also called hereinafter alloy of precious metal and of boron, and a method for manufacturing a part made from this alloy. The alloy is manufactured by synthesis in molten salts, a synthesis also known by its Anglo-Saxon name Synthesis in Molten Salts or SMS. This synthesis involves placing reactive substances of the precious metal and of the boron in each other's presence in a medium comprising salts. When the whole is heated, the salts melt, consequently acting like a liquid medium. The synthesis of the alloy of precious metal and of boron in molten salts uses a source of metal and a source of boron. The source of metal can be chosen from the group comprising the sulphates, the carbonates, the acetates, the nitrates, the acetylacetonates and the halides of the precious metal. Preferably, the source of precious metal is a halide and, even more precisely, a chloride of the precious metal ($MCl_x$). The precious metal is chosen from gold (Au), silver (Ag), platinum (Pt), palladium (Pd), ruthenium (Rh) and iridium (Ir) and, more preferably, from gold, silver, platinum and iridium. The source of boron can be chosen from the group comprising the boranes ($B_xH_y$) and the borohydrides ($MBH_4$). Preferably, the source of boron is sodium borohydride ($NaBH_4$). Thus, the reaction is preferably carried out in the presence of a chloride of the precious metal, such as $AuCl_3$ for gold (Au), and of sodium borohydride ($NaBH_4$). With regard to the salts acting as a reaction medium, they are preferably soluble in water to allow the recovery of the boride after the reaction. For example, this can be a mixture of one or more salts of alkali metals and more precisely of halides, of carbonates, of sulphates or of nitrates. Preferably, this can be a eutectic mixture of lithium chloride and of potassium chloride in a ratio of 45-50% by weight of LiCl and 55-50% by weight of KCl which has a melting point of approximately 355° C. The salt is preferably present in a molar quantity greater than the total molar quantity of the boron in the source of boron and of the metal in the source of precious metal.

The salt it typically solid at ambient temperature and is melted at a temperature between 100 and 1000° C., preferably between 355 and 900° C. during the reaction. Ideally, this is above the melting temperature of the mixture of salts, but below the vaporisation temperature of this mixture. For example, the mixture LiI/KI partly vaporises beyond 850° C.

Moreover, the reactive medium can optionally include one or more additives having the function of controlling the size of the particles and/or the morphology of the boride obtained. This can, for example, be an iodide such as an iodide of potassium or of sodium. The quantity of additive is preferably between 1 and 100 moles per mole of metal in the source of precious metal.

The method can be carried out at ambient pressure or at a pressure greater than ambient pressure. The atmosphere can be controlled. Thus, the use of salts of lithium and of potassium requires having to work under an inert atmosphere, because of the sensitivity of these chemical products to water and/or to oxygen. Consequently, the precursors are manipulated and mixed under an inert atmosphere of argon. The synthesis itself is carried out under an atmosphere of argon and not of nitrogen, given that nitrogen is capable of reacting with certain species of boron and of leading to the formation of boron nitride.

The method is carried out by mixing the source of precious metal, the source of boron and the salt(s). The whole is heated to the desired temperature to melt the salt or the mixture of salts and maintained at this temperature for a time preferably between 30 minutes and 10 hours. After the reaction, the reactive medium is left to cool preferably naturally. Borides of metal in the form of aggregates dispersed in a volume of solid salts are obtained. To eliminate the salts, cycles of washing/centrifugation in a polar solvent such as water or methanol are carried out.

The alloy coming from this method of manufacturing in molten salts is in the form of a powder formed by aggregates of crystalline nanoparticles of metal boride $M_xB_y$, dispersed in a matrix of amorphous boron B. Nanometric particles means particles, the size of which is between 5 and 200 nm, preferably between 10 and 100 nm. The aggregates typically have a size between 0.3 and 1 micrometre. Preferably, the stoichiometric ratio y/x of the metal boride $M_xB_y$ that composes the crystalline nanoparticles is greater than or equal to 1 and, more preferably, greater than or equal to 2. Thus, for an alloy of 18-carat gold, the nanoparticles must correspond to the composition $AuB_y$, with y close to 6.

According to a first embodiment of the invention, the alloy coming from the method for manufacturing by synthesis in molten salts is directly used to manufacture a part by powder metallurgy. The powder formed by the aggregates is used as such or is previously ground to obtain a powder with a D50 of less than 70 μm. In other words, 50% of the particles forming the powder have a diameter less than or equal to 70 μm.

According to a second embodiment of the invention, the alloy is enriched with precious metal before the manufacturing of the part by powder metallurgy. This enrichment is carried out via the additional steps involving:

providing a quantity of the powder of the aforementioned alloy, the powder being able to come directly from the method for synthesis in molten salts or be ground to reach the D50 of less than 70 μm;

providing a quantity of powder of precious metal. This can be the same precious metal as that used as a source to obtain the alloy by synthesis in molten salts. It is also possible to enrich the alloy with another precious metal or with a mixture of precious metals. This powder has a D50 of less than 70 μm, mixing these two quantities of powders and sintering the resulting mixture as described below in order to obtain, after sintering, an alloy comprising crystalline nanoparticles of metal boride $M_xB_y$ with M which is the precious metal, distributed in a matrix formed by amorphous boron B and metal boride $M_zB_a$, with z and a which can be equal to or less than x and y, respectively. It is noted that the stoichiometry of the particles of metal boride dispersed in the matrix of boron is not usually the same as that of the particles of metal boride that form the matrix with the boron. The particles of metal boride that form the matrix with the boron often have a molar fraction z of the metal equal, or even slightly greater, than the molar fraction a of the boron.

It is specified that elements other than precious metals such as, for example, nickel can be added to the mixture during this step. It will also be noted that at the end of the sintering operation, the product obtained is reduced to the state of a powder, typically by micronisation.

The method for manufacturing the part, whether it is with the alloy according to the first alternative or with the alloy according to the second alternative, then includes the following steps:

compacting the powder by applying a uniaxial pressure;
subjecting said compacted powder to a treatment of spark plasma sintering (or flash sintering) under a pressure between 0.5 GPa and 10 GPa, or to a treatment of hot isostatic pressing (or HIP) under a pressure between 80 bar and 2200 bar, the treatment being carried out at a temperature between 400° C. and 2100° C. in order to obtain at least one ingot of an alloy of precious metal and of boron;
machining the ingot of alloy of precious metal and of boron in order to obtain the desired part, or
reducing the ingot of alloy of precious metal and of boron to the state of a powder by a treatment of micronisation, and obtaining the desired part by treatment of the powder resulting from the micronisation treatment.

Once the ingot of alloy of precious metal and of boron has been micronised, a first possibility for obtaining the desired massive part involves introducing the powder resulting from the micronisation treatment into a mould and subjecting this mould to a uniaxial or isostatic pressure.

Once the ingot of alloy of precious metal and of boron has been micronised, a second possibility for obtaining the desired massive part involves subjecting the powder resulting from the micronisation treatment to a treatment of three-dimensional additive manufacturing.

The treatment of three-dimensional additive manufacturing can be of the type with direct printing. The available techniques of three-dimensional additive manufacturing of the direct type are laser sintering, also known by its Anglo-Saxon name Selective Laser Melting or SLM and the sintering by electron bombardment also known by its Anglo-Saxon name e-beam melting.

The treatment of three-dimensional additive manufacturing can be of the type with indirect printing. The available techniques of three-dimensional additive manufacturing of the indirect type are:
Inkjet printing (inkjetting): the powder resulting from the treatment of micronisation of the ingot of alloy of precious metal and of boron is dispersed in the ink. The ink is printed layer after layer, each layer being hardened by exposure to the radiation of a source of for example UV light before deposition of the following layer.
NanoParticle Jetting (NPJ): this technique, in particular developed by the company XJet, is similar to printing via jet of liquid ink, with the difference that the ink is composed of nanoparticles in suspension resulting from the micronisation treatment. The suspension is then projected, then dried layer by layer.
Digital light projecting (DLP): this technique involves projecting, by reflection on a mirror, the image of the part that it is desired to structure onto a bed of powder containing the particles of powder resulting from the micronisation treatment dispersed in a photopolymer.

Once the ingot of alloy of precious metal and of boron has been micronised, a third possibility for obtaining the desired massive part involves subjecting the powder resulting from the treatment of micronisation of the ingot to a treatment of three-dimensional additive manufacturing, of injection or of micro-injection in the presence of a polymer binder. Thus, the powder resulting from the treatment of micronisation of the ingot of alloy of precious metal and of boron is mixed with the polymer binder in order to obtain a feedstock. Then a green body, the shape of which corresponds to the profile of the desired part, is created by subjecting the feedstock either to an injection or to a micro-injection, or to a technique of additive manufacturing.

Among the indirect available techniques of additive manufacturing in the presence of a polymer binder, the following can be mentioned:
Solvent on granulate jetting: this technique involves projecting a solvent onto a bed of granulates formed by the feedstock. The dimensions of these granulates are approximately 10 µm to 50 µm. The desired part is printed layer by layer, the granulates agglomerating via the binder.
FFD (Fused Filament Deposition): filaments, the dimensions of which are in the millimetre range, are created by agglomerating the feedstock. These filaments are then heated and the material from which they are made escapes from a nozzle, the diameter of which is approximately 40 µm and allows to print the desired part in three dimensions.
Micro-extrusion.

Alternatively, the mixture between the binder and the powder can be directly created during the additive manufacturing by using the technique of binder jetting which involves projecting a jet of ink containing a solvent and a binder onto a bed of powder formed by the particles of powder resulting from the micronisation treatment.

As for the binder, it is chosen from the group formed by polyethylene glycol (PEG), cellulose acetate butyrate (CAB), nano-cellulose (nanometric derivative of cellulose), corn starch, sugar, polylactic acid (or PLA), polyethylene, polypropylene, synthetic or natural wax and stearic acid.

A brown body is obtained by subjecting the green body to a step of elimination of the polymer binder called step of debinding during which the green body is treated chemically, then thermally in a furnace to burn the residual polymer binder, this step of debinding typically being carried out in gaseous phase in an atmosphere of nitric acid or of oxalic acid and at a temperature between 100° C. and 140° C.

Finally, the brown body is subjected to a treatment of sintering under a protected atmosphere and at a temperature between 700° C. and 1800° C. in order to obtain the desired part.

It is noted that it is possible, after the sintering treatment, to subject the part coming from the sintering step to a step of post-treatment via hot isostatic pressing (or HIP) under a pressure between 500 bar and 2200 bar, and at a temperature between 600° C. and 2100° C.

The part thus manufactured is made from an alloy made of boride of precious metal. This alloy is, according to the first alternative, formed by crystalline nanoparticles of $M_xB_y$, where M is the precious metal distributed in an amorphous matrix of B boron. According to the second alternative, the alloy enriched with precious metal includes the crystalline nanoparticles of $M_xB_y$ distributed in an amorphous matrix of boron B and of boride $M_xB_a$ of precious metal. The precious metal M is chosen from gold (Au), silver (Ag), platinum (Pt), palladium (Pd), ruthenium (Rh) and iridium (Ir). Preferably, it is chosen from gold, silver, platinum, and iridium and more preferably it is gold. Preferably, the ratio y/x of the $M_xB_y$ nanoparticles is greater than or equal to 1, more preferably, it is greater than or equal to 2. As for the ratio a/z, it is typically less than or equal to 1.

The light alloys of precious metals in question here are titratable, that is to say that these are alloys, the ratio of which between the mass of the precious metal that enters into the composition of the alloy and the total mass of this alloy is determined by law. A remarkable alloy of precious metal obtained via the method of the invention is an 18-karat alloy of gold and of boron having the composition $AuB_6$ with a density between 6.6 and 7 g/cm$^3$. It is also noted that the powder of gold used in the context of the present invention is preferably a powder of 24-karat bright ½ yellow gold.

The part can, in particular, be a timepiece or a piece of jewellery and, more precisely, an external part such as a middle, a bottom, a bezel, a pushbutton, a wristlet link, a dial, a hand, a dial index, etc.

It goes without saying that the present invention is not limited to the embodiments that have just been described and that various simple modifications and alternatives are possible for a person skilled in the art without going beyond the context of the invention as defined by the appended claims.

The invention claimed is:

1. A method for manufacturing a powder of alloy of a boride of a precious metal from the precious metal and from boron, the method comprising:

mixing a source of the boron, a source of the precious metal, and salt(s) in the solid state to obtain a mixture;

heating the mixture to a temperature between 100 and 1000° C. to react the source of the boron and the source of the precious metal in order to obtain the metal boride of the precious metal to obtain a heated mixture;

cooling the heated mixture;

separating solidified salt(s) from the boride of the precious metal, the boride of the precious metal being in form of the powder including aggregates formed by crystalline nanoparticles of the boride of the precious metal, $M_xB_y$, distributed in a matrix of amorphous boron B, a y/x ratio of the crystalline nanoparticles being greater than or equal to 1, wherein the precious metal is selected from the group consisting of gold, silver, platinum, palladium, ruthenium, and iridium, wherein the source of the precious metal is selected from the group selected from a sulfate, carbonate, acetate, nitrate, acetylacetonate, or mixture of two or more of any of these, of the precious metal, and wherein the method comprises reacting the source of the precious metal with the source of the boron in the salt(s) in molten state.

2. The method of claim 1, wherein the source of boron is selected from the group consisting of a borane, borohydride, or mixture of two or more of any of these.

3. The method of claim 2, wherein the source of boron is sodium borohydride, NaBH$_4$.

4. The method of claim 1, further comprising:

mixing a powder of the precious metal and/or of further precious metal with the powder of the alloy to obtain a second mixture of the powder of the boride of precious metal with the precious metal and/or with the further precious metal;

sintering the second mixture, and reducing the boride of the precious metal resulting from the sintering to a powder state, wherein the method comprises enriching the powder of the alloy with further precious metal.

5. The method of claim 4, wherein the powder of the precious metal and/or the further precious metal has a d50 of less than 70 μm, and wherein the powder of the boride has a d50 of less than 70 μm.

* * * * *